(12) United States Patent
Van Blokland

(10) Patent No.: US 8,608,467 B2
(45) Date of Patent: Dec. 17, 2013

(54) DEVICE AND METHOD FOR TWISTING ELONGATED DOUGH STRIPS

(75) Inventor: Johannes Josephus Antonius Van Blokland, Beusichem (NL)

(73) Assignee: Rademaker B.V. (NL)

( * ) Notice: Subject to any disclaimer, the term of this patent is extended or adjusted under 35 U.S.C. 154(b) by 656 days.

(21) Appl. No.: 12/773,297

(22) Filed: May 4, 2010

(65) Prior Publication Data
US 2010/0297319 A1    Nov. 25, 2010

(51) Int. Cl.
*A21C 3/08* (2006.01)

(52) U.S. Cl.
USPC ............... 425/304; 425/3; 425/319; 425/334; 425/391; 426/500

(58) Field of Classification Search
CPC .......................................... A21C 3/08
USPC .......... 425/3, 304, 305.1, 307, 323, 319, 334, 425/391; 426/500, 512; 264/285, 294, 339
See application file for complete search history.

(56) References Cited

U.S. PATENT DOCUMENTS

| | | | | |
|---|---|---|---|---|
| 1,906,847 A | * | 5/1933 | Fitzgerald | 425/321 |
| 1,974,503 A | | 9/1934 | Milosevich | |
| 1,998,560 A | | 4/1935 | Smith | |
| 2,037,985 A | * | 4/1936 | Kummer | 425/145 |
| 2,216,787 A | * | 10/1940 | Steadman et al. | 425/334 |
| 2,843,062 A | | 7/1958 | Kieffaber | |
| 2,898,630 A | * | 8/1959 | Adams | 425/302.1 |
| 3,038,418 A | | 6/1962 | Gugler | |
| 3,394,646 A | | 7/1968 | Cunningham et al. | |
| 3,522,777 A | | 8/1970 | Schafer | |
| 3,564,649 A | * | 2/1971 | Soderquist | 425/29 |
| 3,993,422 A | | 11/1976 | Riviere et al. | |
| 4,036,569 A | * | 7/1977 | Oshikiri | 425/140 |
| 4,155,687 A | * | 5/1979 | Grunner | 425/3 |
| 4,767,638 A | | 8/1988 | Uhrovic | |
| 5,009,910 A | * | 4/1991 | Zwicker | 426/499 |
| 5,473,796 A | * | 12/1995 | Fusillo | 24/30.5 R |
| 5,639,408 A | * | 6/1997 | King et al. | 264/103 |

(Continued)

FOREIGN PATENT DOCUMENTS

| | | |
|---|---|---|
| CH | 652566 A5 * | 11/1985 |
| DE | 3903122 C1 | 5/1990 |
| EP | 0403217 A1 | 12/1990 |
| EP | 1384408 A1 | 1/2004 |

(Continued)

OTHER PUBLICATIONS

Translation of JP 2009-142171.*

*Primary Examiner* — Dimple Bodawala
(74) *Attorney, Agent, or Firm* — The Webb Law Firm, P.C.

(57) ABSTRACT

The present invention relates to a device for twisting elongated dough strips, comprising at least one pair of grippers, each arranged for gripping and respectively releasing one short side of a dough strip, and means for mutually rotating the grippers around an axis of rotation. In an embodiment, the device comprises a first conveyor for supplying dough strips oriented with their long sides perpendicular to the direction of conveyance wherein the width of the first conveyor is chosen smaller than the long sides of the dough strips so that the short sides of a dough strip protrude from the first conveyor, and a second conveyor for carrying off the twisted dough strips. The invention further provides a method for twisting an elongated dough strip.

8 Claims, 6 Drawing Sheets

(56) References Cited

U.S. PATENT DOCUMENTS 6,136,360 A * 10/2000 Tsuchida et al. .............. 426/500
6,983,559 B1 * 1/2006 Kraus ................................ 43/4
7,879,377 B2 * 2/2011 Dahl et al. .................... 426/282

FOREIGN PATENT DOCUMENTS

| GB | 108699 | | 8/1917 |
|----|--------|---|--------|
| JP | 2009142171 A | * | 7/2009 |
| JP | 2011097895 A | * | 5/2011 |

* cited by examiner

DEVICE AND METHOD FOR TWISTING ELONGATED DOUGH STRIPS

CROSS REFERENCE TO RELATED APPLICATIONS

This application claims priority to European patent application number 09160658.2, filed May 19, 2009, which is incorporated by reference herein.

FIELD OF THE INVENTION

The present invention relates to a device for twisting elongated dough strips. These products are characterised in that they comprise an elongated dough strip, that may be filled, for example with cream, that is twisted about its longitudinal axis. Twisting the dough strips is currently done manually, which is time consuming and costly. It is therefore a goal of the present invention to automatize this process.

BACKGROUND OF THE INVENTION

U.S. Pat. No. 1,998,560 discloses a device for merging two rolls of dough. Although the rolls are referred to as strip, the device is not suitable for forming an elongated dough strip twisted about its longitudinal axis.

U.S. Pat. No. 1,974,503 discloses a machine for twisting loaves of bread as to make the texture of the bread finer. This machine is also not suitable for forming an elongated dough strip twisted about its longitudinal axis.

U.S. Pat. No. 3,522,777 discloses a device comprising a pair of oppositely disposed rotatable elements, operating simultaneously upon a strip of seized pastry disposed there between to convolute said seized pastry. Although this device partially automates the twisting of dough strips, it is not suitable to continuously handle dough strips while being conveyed.

SUMMARY OF THE INVENTION

The invention therefore provides a device and a method for twisting elongated dough strips.

By gripping the dough strip at its mutual short sides with the aid of the grippers, and mutually rotating the grippers afterwards, the dough strip is twisted automatically, without the need for human interaction. The gripper may comprise a mouth, with two essentially flat mouth parts, that can be moved toward and from each other, for clamping the dough sheet, respectively releasing it. Preferably, in the closed position, the mouth parts enclose an essentially flat space, that extends in the plane of the dough strip to be twisted. As a result, the dough strip is pinched between the essentially flat mouth parts, enabling the necessary force for twisting the dough strips to be exerted on the dough strip.

The device may further comprise a first conveyor for supplying dough strips. The dough strips are preferably oriented with their long sides perpendicular to the direction of conveyance on the first conveyor. Furthermore, the width of the first conveyor is preferably chosen smaller than the long sides of the dough strips so that the short sides of a dough strip protrude from the first conveyor so that they can be gripped by the pair of grippers, without clamping the first conveyor. A second conveyor may be provided for carrying off the twisted dough strips after mutual rotation of the grippers from the pair of grippers. The first conveyor and the second conveyor may be the same physical conveyor, but separate physical entities may be favourable in certain embodiments.

The at least one pair of grippers may comprise a transporter, for transporting the grippers along a track that comprises at least a grip area, wherein the grippers are arranged on opposite sides of the first conveyor, at such distance that they can grip the protruding short sides of a dough strip on the first conveyor without gripping the first conveyor, a twist area, wherein the grippers are arranged at at least such a distance from the first conveyor, that the dough strip does not contact the first conveyor while being twisted by mutually rotating the grippers, and a release area, wherein the twisted dough strip is put on the second conveyor. The term "area" is to be interpreted as a part of the track, which may be one particular location, or an interval.

A plurality of pairs of grippers may be coupled to the same transporter, preferably each pair at an equal distance from an adjacent pair. For transporting a gripper from the release area back to the grip area, the track may be closed, thus forming a carrousel for the pairs of grippers.

The transporter is advantageously arranged to transport the gripping means in the grip area with a speed that matches the speed of conveyance of the first conveyor, for gripping a dough strip while it is conveyed. Hereby, a relatively high throughput can be obtained, and moreover, the device becomes suitable for incorporation in an automated dough-line, with a continuous dough speed.

Although the grippers may comprise individual actuators for rotating them, it is advantageous when the means for mutually rotating the grippers comprise a first drivable belt, stretching at least along part of the twisting area, for engaging a wheel coupled with the gripper, causing an angular speed of the gripper that is proportional to the difference between the speed of the transporter and the speed of the belt. Instead of a belt and a wheel, a chain and a chain wheel may be used. In case a wheel is applied, the wheel may be covered with a friction material, such as polyurethane or a rubber or rubber-like material.

It may be desired to control or set up the number of turns the dough strip is twisted. With the device according to the present invention, this can be controlled by the difference between the angular speed of both grippers of one pair of grippers. Speed is to be understood here as having a magnitude and a direction. That means that both grippers may turn in the same direction with a different magnitude of the speed, or they may turn in opposite directions, or only one of the grippers may turn, while the other stays at a fixed angular orientation. This way of controlling the number of turns has the advantage that the number of turns is independent of the distance of the twisting area, which may therefore be designed with a fixed length. Furthermore, the device can be easily configured to create left or right pitch twisted dough strips.

Each gripper may comprise an actuating member, for actuating the gripper from a grip status to a release status. This may be an active component, such as an electrical actuator like an engine, or a mechanical actuating member, such as a pushing member, for either closing or opening for example a mouth of the gripping member upon pushing it. In particular, the actuating member may comprise a push rod, extending through the gripper, for closing the gripper upon pushing the rod, and a spring, acting on the pushing rod, for returning the gripper to its neutral or opened position, when a pushing force is terminated. The gripping element may be default opened or default closed.

A bar that stretches at least partly along the grip area and the twist area, for engaging the pushing member when the gripper is transported along the gripping area and the twisting area may be provided. This way, the location where the gripper opens and closes can be exactly determined, and related to the grip area, the twist area and the release area. The bar may have at least one tapered end, to smoothen the transition from the opened to the closed situation of the gripper. Furthermore, the bar may be adjustable, for tuning the exact location where the gripper opens and closes, or the extent to which the gripper opens and closes. For the latter, the bar may be moved in a direction towards or from the first conveyor. Adjusting the extent can be done when a different type of dough is used for example.

In order to secure the position of the grippers of a pair of grippers after twisting the dough strip, a second drivable belt or chain is provided, stretching at least along part of the release area, for engaging the wheel or gear wheel coupled with the gripper, wherein the speed of the second drivable belt is kept equal to the speed of the second conveyor, for fixing the position of the twisted dough strip on the second conveyor. Further along the release area, the bar is terminated, so that the twisted dough strip is released. The first and the second conveyor may be arranged in the same plane, so that a twisted dough strip, which is more voluminous than a flat one, is pressed somewhat on the second conveyor by the grippers, for fixing its position.

In a further preferred embodiment, the transporter comprises an initialisation area, wherein the grippers are initialised in a predetermined angular orientation around their axis of rotation for gripping. It is preferred that the grippers are oriented such that they clamp a dough strip in the plane of the part of the strip that rests on the first conveyor. However, in the area that closes the loop, no belt or chain may be present to fix the angular orientation of the grippers.

Therefore, the gripper may have a preferential angular position around its axis of rotation, from which it can be moved by overcoming a threshold torque, and wherein a rotational force lower than the threshold torque is exerted on the gripper in the initialisation area. As a result, the gripper will rotate until it reaches the preferential angular position, and afterwards, the force exerted is to low to overcome the threshold torque.

For obtaining the preferential position, the gripper can be provided with a first magnet, fitted on a rotating member of the gripper for cooperation with a second magnet arranged at a fixed position around its axis of rotation. Once both magnets are outlined, the preferential angular position is reached, and the gripper stays fixed on the annular position.

In a further embodiment, the device according to the present invention, comprises cutting means, for cutting the dough strips from a continuous dough piece, wherein the cutting means are configured to provide the dough strips at a mutual distance that corresponds with the mutual distance of two adjacent pairs of grippers.

To guarantee a synchronisation between the cutting means and the grippers, the cutting means may be coupled to a drive of the first conveyor, and/or to the transporter. This coupling may be a mechanical coupling, by a shaft or gearing or the like, or servo-coupling based on a master-slave synchronous positioning system. The fact that the cutting means and the first conveyor and/or transporter may be coupled does however not mean that they have exactly the same speed. Instead, it is preferred that the speed behind the cutting means is higher than before the cutting means, to provide a space between the dough strips.

BRIEF DESCRIPTION OF THE DRAWINGS

The invention will now be explained into more detail, with reference to the following non limitative figures. Herein.

DETAILED DESCRIPTION

Figure 1:
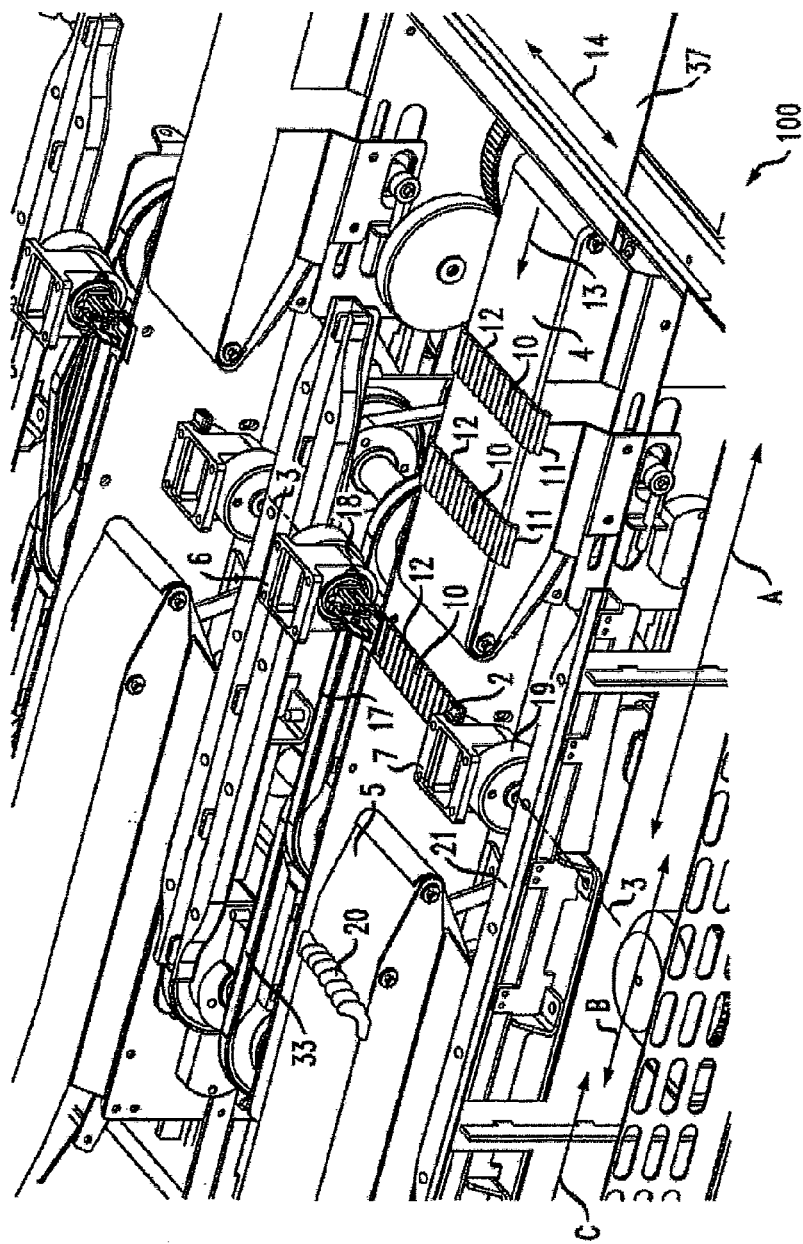
FIG. 1 shows a perspective view of a device for twisting elongated dough strips according to the present invention.

FIG. 1 shows a perspective view of a device 100 for twisting elongated dough strips 10 according to the present invention. The device 100 comprises a pair of grippers 1, 2 arranged for gripping and respectively releasing one short side 11 of a dough strip 10. The grippers 1, 2 comprise means for mutually rotating the grippers 1, 2 around an axis of rotation 3. The device 100 further comprises a first conveyor 4 for supplying the dough strips 10 oriented with their long sides 12 perpendicular to the direction 13 of conveyance. The width 14 of the first conveyor 4 is chosen smaller than the long sides 12 of the dough strips 10 so that the short sides 11 of a dough strip 10 protrude from the first conveyor 4, and a second conveyor 5 for carrying off the twisted dough strips 20.

While twisting the dough strip 10, the grippers 1, 2 take the dough strip 10 from the first conveyor 4 to the second conveyor 5. Thereto, the device 100 comprises a carriers 6, 7 that form part of a transporter, for transporting the grippers 1, 2 along a track A, B, C that comprises at least a grip area A, wherein the grippers 1, 2 are arranged on opposite sides of the first conveyor 4, at such distance that they can grip the protruding short sides 11 of a dough strip 10 on the first conveyor 4 without gripping the first conveyor 4, a twist area B, wherein the grippers 1, 2 are arranged at at least such a distance from the first conveyor 4, that the dough strip 10 does not contact the first conveyor 4 when being twisted by mutually rotating the grippers 1, 2 and a release area C, wherein the twisted dough strip 20 is put on the second conveyor 5. The carriers 6, 7 of the transporter are guided along the track, for example a belt or a chain 8, as shown in FIG. 2 below.

Figure 2:
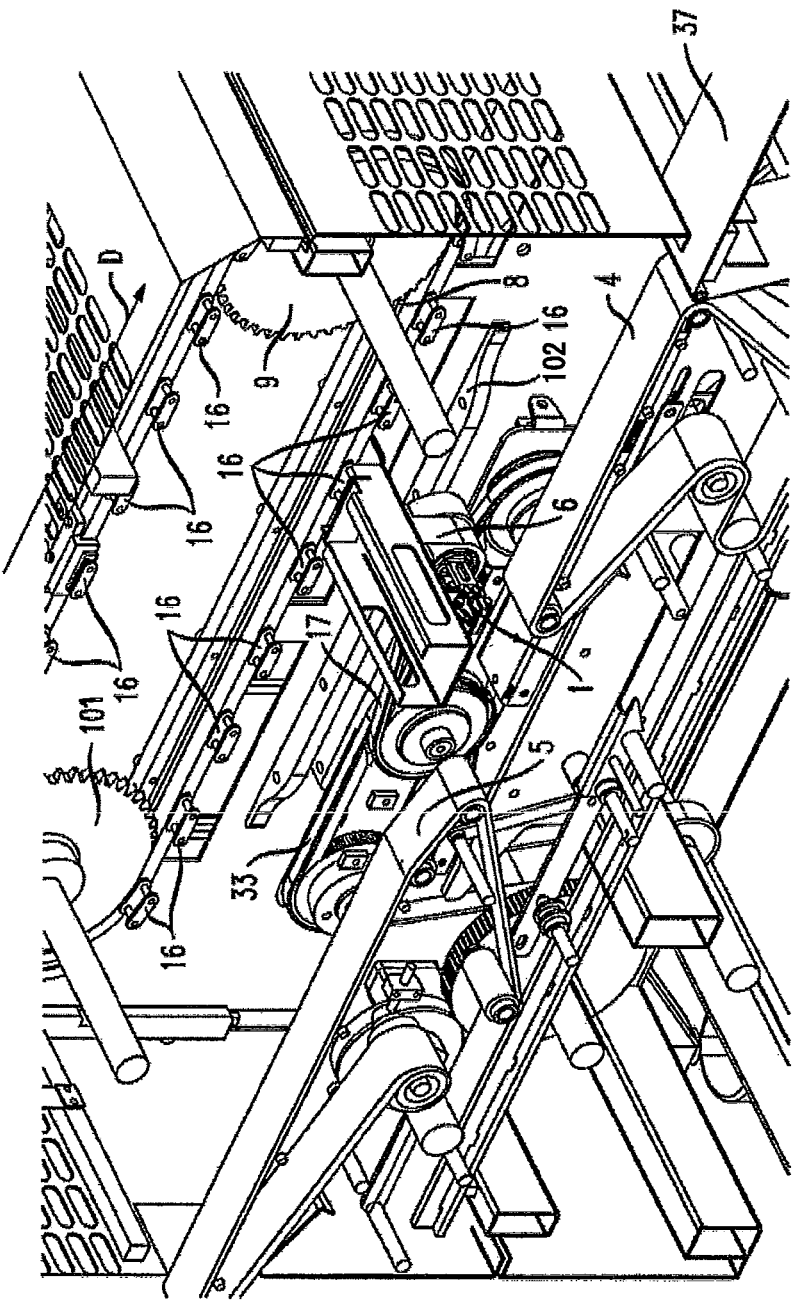
FIG. 2 shows a detailed view of the device of FIG. 1.

FIG. 2 shows an endless chain 8, driven by chain wheels 9, 101. The chain 8 is provided by connectors 16, for a carrier 6 for gripper 1. For reasons of clarity, only carrier 6 and gripper 1 are shown in FIG. 2, but all connectors 16 are intended for carrying a gripper 1. The track is closed, so that grippers 1, 2 pass area D to get back to the grip area A from the release area C. The transporter is arranged to transport the grippers 1, 2 in the grip area A with a speed that matches the speed of conveyance of the first conveyor 4, for gripping a dough strip 10 while it is conveyed by the first conveyor 10. The device 100 further comprises a first drivable belt 17, stretching at least along part of the twisting area B, for engaging a wheel 18, 19 coupled with the respective gripper 1, 2, causing an angular speed of the gripper 1, 2 that is proportional to the difference between the speed of the transporter chain 8 and the speed of the belt 17, 17' (Belt 17' for gripper 2 is not shown). The number of twisting turns of the dough strip 10 is controlled by the difference between the angular speed of both grippers 1, 2 of one pair of grippers 1, 2, caused by different speeds of belts 17 and 17' (not shown).

Figure 3A:
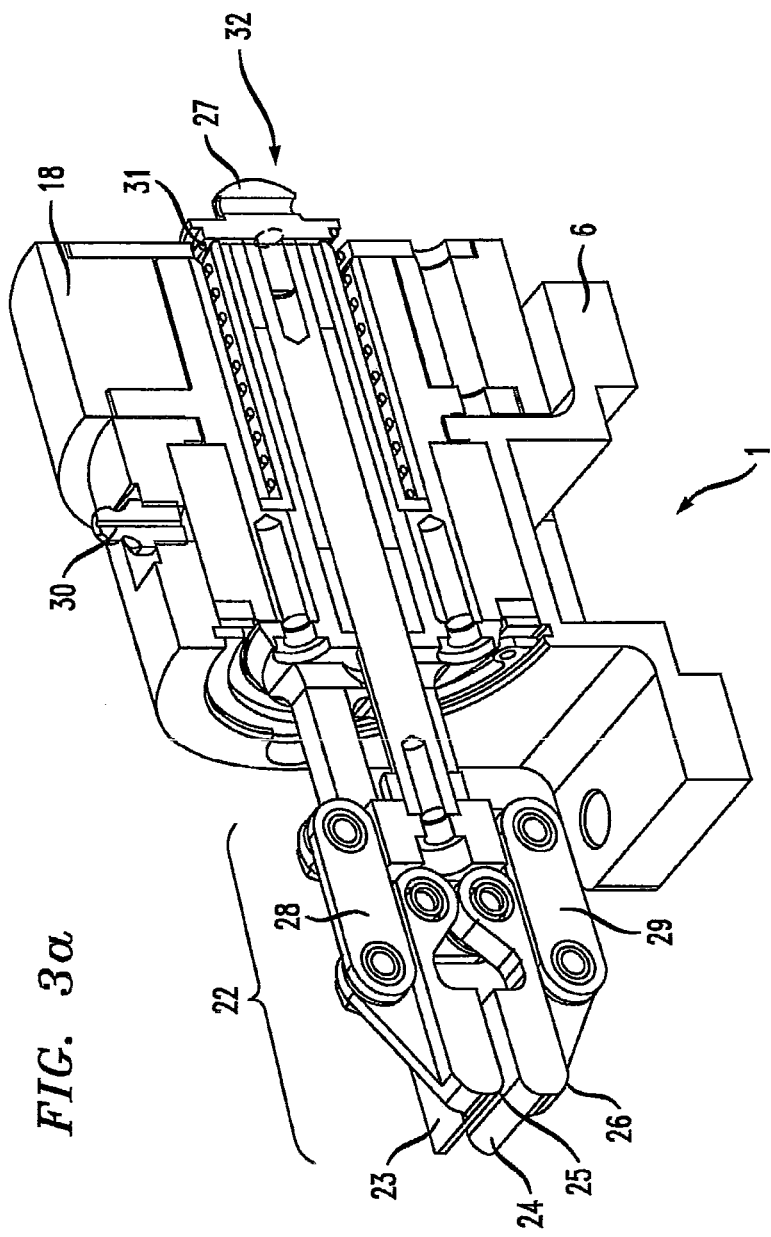
FIG. 3a shows a sectional view of a gripper in a closed status.

FIG. 3a shows gripper 1 in more detail. Gripper 1 comprises a mouth 22, having a first mouth part 23 and a second mouth part 24, that can be closed and opened, for gripping, respectively releasing a dough strip, and a pushing member 27, for either closing or opening the mouth 22 upon pushing it. Thereto, the pushing member is connected to the mouth parts 23 and 24 by arms 28 and 29. The gripper 1 is shown in a closed position that is obtained by exerting a force in the direction 32 against pushing member 27. The force is counterbalanced by spring 31 that urges the gripper 1 normally in an opened status. The force in the direction 32 is exerted by a bar 102, visible in FIGS. 1 and 2, that stretches at least partly along the grip area A and the twist area B, for engaging the pushing member 27 when the gripper 1 is transported along the gripping area A and the twisting area B. Rotation of the gripping member for twisting the dough strip is caused by interaction between the wheel 18 and belt 17, visible in FIGS. 1 and 2.

Also visible in FIGS. 1 and 2 is a second drivable belt 33, stretching at least along part of the release area C, for engaging the wheel 18 coupled with the gripper 1, wherein the speed of the second drivable belt 33 is kept equal to the speed of the second conveyor 5, for fixing the position of the twisted dough strip 20 on the second conveyor 5. Further shown in FIG. 3a is a nipple 30 for greasing the bearing of the gripper 1.

Figure 3B:
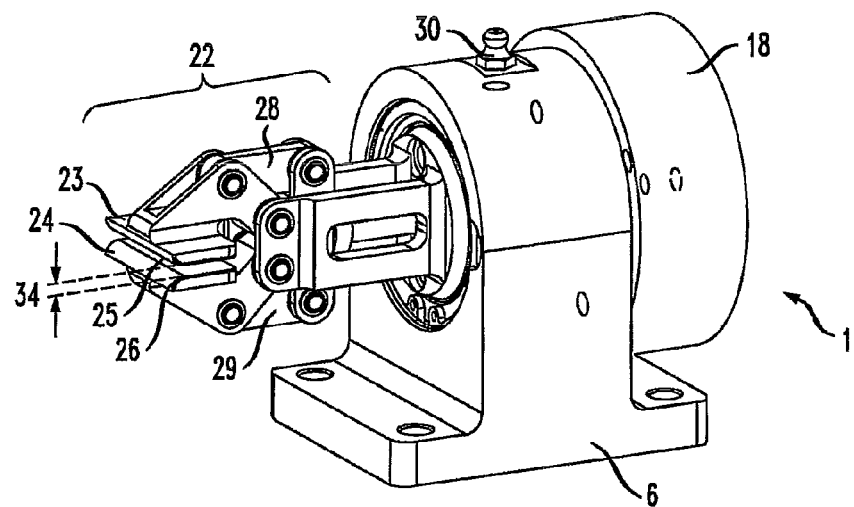
FIG. 3b shows the device of FIG. 3a in a partly exploded perspective view.

FIG. 3b shows a perspective view of the gripper 1 of FIG. 3a, in the closed position. Between the mouth parts 23 and 24, that have rounded edges 25, 26 to prevent the dough to stick at the gripper during releasing of the twisted dough strip, and to prevent tearing the dough strip during twisting, a distance 34 is present between the mouth parts 23 and 24 in the closed position, so that the mouth parts 23 and 24 enclose an essentially flat space, that extends in the plane of the dough strip to be twisted. A dough strip is pinched between the mouth parts 23 and 24, enabling the necessary force for twisting the dough strips to be exerted on the dough strip.

Figure 3C:
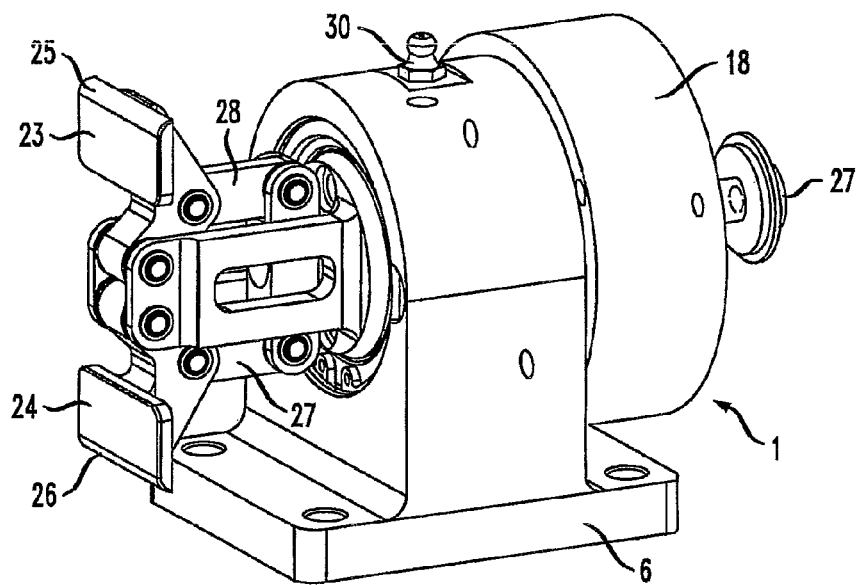
FIG. 3c shows the device of FIGS. 3a and 3b in an opened status.

FIG. 3c shows the gripper 1 of FIGS. 3a and 3b in an opened position that is reached when no force is exerted on pushing member 27. The gripper is in its preferential angular position.

Figure 3D:
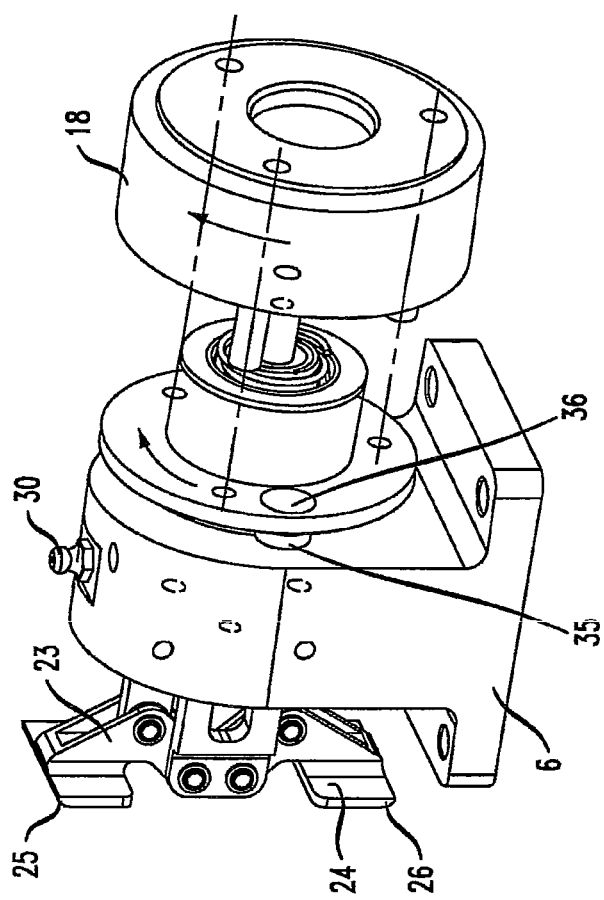
FIG. 3d shows the device of FIG. 3c from another perspective.

FIG. 3d shows the gripper 1 of FIG. 3c from another perspective. The wheel 18 is shown translated along its axis of rotation, in order to show a first magnet 36 that cooperates with a second magnet 35, to determine a preferential angular position, from which the gripper 1 can be moved by overcoming a threshold torque. The first magnet 36 rotates when the gripper is rotated around its axis of rotation, while the second magnet is at a fixed position on the carrier 6. In the initialisation area D, a rotational force lower than the threshold torque is exerted on the gripper, by a friction element (not shown) for rotating the wheel 18 arranged along area D.

Figure 4:
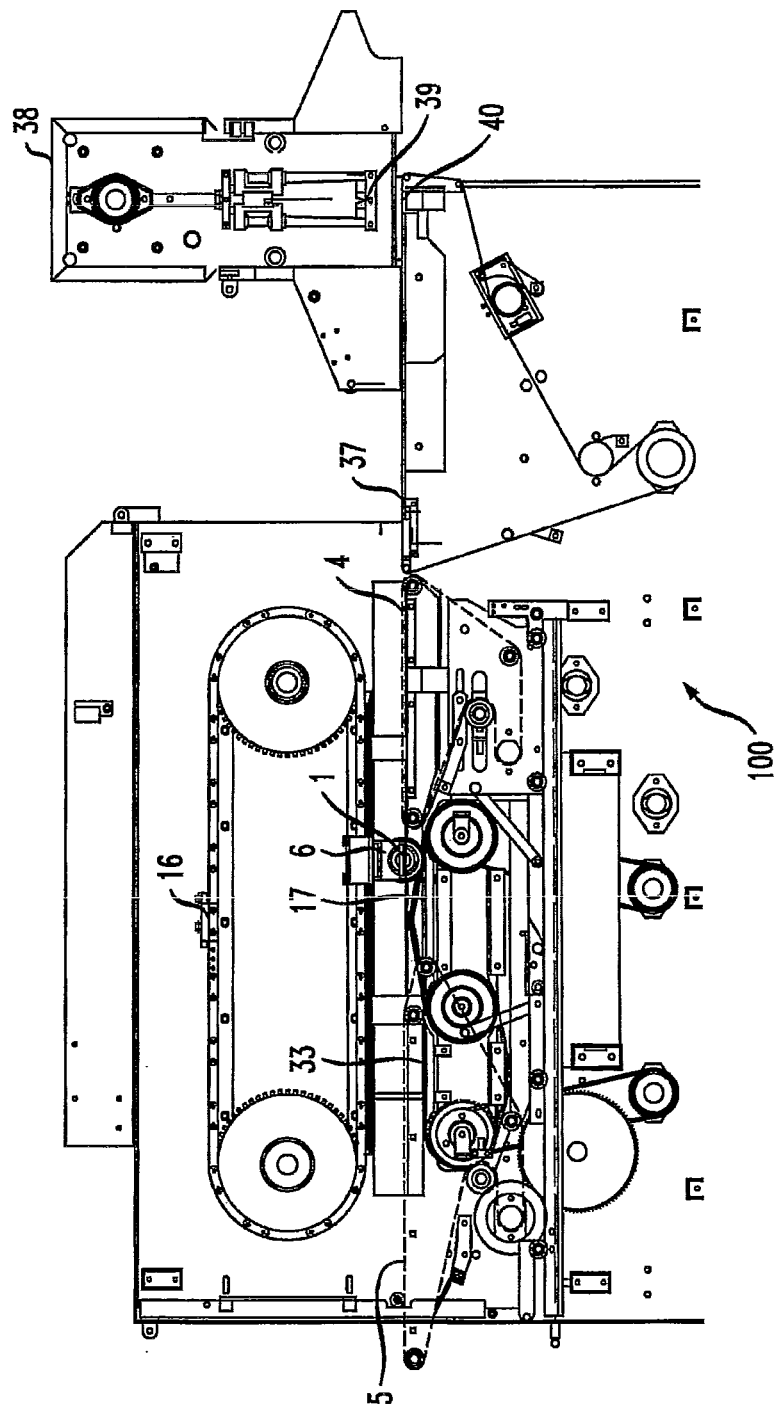
FIG. 4 shows a sectional overview of the device according to the invention.

FIG. 4 shows a sectional overview of the device 100 according to the present invention. Dough strips are delivered to the first conveyor 4 by a cutter-conveyor 37 that is arranged to have a lower speed than the first conveyor. Herewith, the dough strips cut by the cooperating chopper 39 and anvil 40 that is disposed below the cutter conveyor 37 of cutting device 38, are separated from each other, with a distance in between them that corresponds to the mutual distance between two adjacent grippers.

What is claimed is:

1. A device for twisting elongated dough strips, comprising:
   a pair of grippers, each gripper in the pair of grippers being arranged for gripping and releasing, respectively, one short side of a dough strip that has a pair of short sides, wherein the grippers are moveable along a track and adapted to be rotatable around an axis of rotation of a wheel coupled to the gripper;
   a first conveyor for supplying the dough strip oriented with its long sides perpendicular to the direction of conveyance, wherein the width of the first conveyor is chosen smaller than the long sides of the dough strip so that the short sides of the dough strip protrude from the first conveyor;
   a transporter, for moving the grippers along the track that comprises at least:
   an initialisation area, wherein each gripper is initially held in a predetermined angular orientation around the axis of rotation of the wheel by a threshold torque from which the gripper can be rotated by overcoming the threshold torque, and wherein a rotational force lower than the threshold torque is exerted on the gripper by a friction element for rotating the wheel arranged along the initialisation area;
   a grip area, wherein the grippers are arranged on opposite sides of the first conveyor, at such distance that they can grip the protruding short sides of a dough strip on the first conveyor without gripping the first conveyor;
   a twist area, wherein the grippers are arranged at a distance from the first conveyor such that the dough strip does not contact the first conveyor when being twisted by mutually rotating the grippers, wherein a twisted dough strip results;
   a release area, wherein the twisted dough strip is put on a second conveyor; and
   the second conveyor for carrying off the twisted dough strip.

2. The device according to claim 1, wherein the transporter is arranged to transport the grippers with a speed in the grip area that matches a speed of conveyance of the first conveyor, for gripping the dough strip while it is conveyed.

3. The device according to claim 1, wherein the grippers are rotated by a first drivable belt or chain that stretches at least along part of the twist area, the first drivable belt or chain engaging a wheel coupled with a gripper of the pair of grippers, creating an angular speed of the gripper rotation that is proportional to a difference between the speed of the transporter and the speed of the first drivable belt or chain.

4. The device according to claim 1, wherein the pair of grippers comprises a first gripper which grips a first short side of the dough strip and a second gripper which grips a second short side of the dough strip and a number of twisting turns of the dough strip is controlled by a difference between an angular speed of the first gripper and an angular speed of the second gripper such that the difference between the angular speeds of the grippers results in twisting of the dough strip.

5. The device according to claim 1, wherein a gripper of the pair of grippers comprises:
   a mouth, that can be closed and opened, for gripping and releasing, respectively, the dough strip;
   a pushing member, for either closing or opening the mouth upon pushing it; and
   a bar that stretches at least partly along the grip area and the twist area, for engaging the pushing member when the gripper is transported along the grip area and the twist area.

6. The device according to claim 3, wherein a second drivable belt or chain is provided, stretching at least along part of the release area, for engaging the wheel coupled with the gripper, wherein the speed of the second drivable belt is kept equal to the speed of the second conveyor, for fixing the position of the twisted dough strip on the second conveyor.

7. The device according to claim 1, wherein the gripper is provided with a first magnet, arranged on a rotary part of the gripper, for cooperation with a second magnet arranged at a fixed position around the axis of rotation of the gripper.

8. The device according to claim 1, further comprising:
a cutter conveyor located at one end of the first conveyor for receiving the dough strip from the first conveyor;
an anvil located along the cutter conveyor; and
a cutter positioned above the anvil.

* * * * *